Oct. 20, 1959
P. E. GIES
2,909,248
LINEAR DAMPER
Filed April 12, 1957
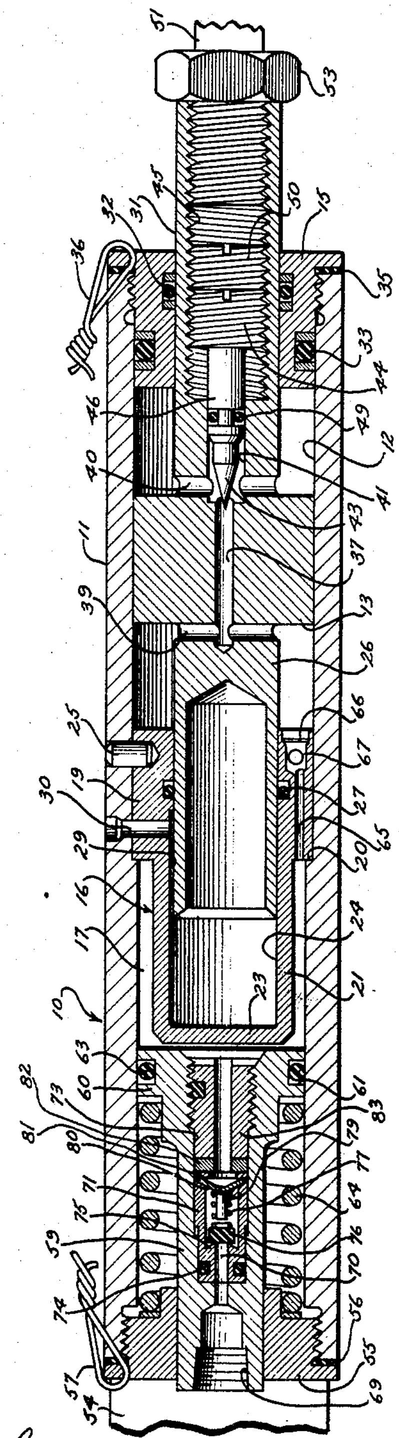
Inventor
PAUL E. GIES
By Hill, Sherman, Meroni, Gross & Simpson Attys United States Patent Office 2,909,248

Patented Oct. 20, 1959

2,909,248

LINEAR DAMPER

Paul E. Gies, Snyder, N.Y., assignor to Houdaille Industries, Inc., Buffalo, N.Y., a corporation of Michigan Application April 12, 1957, Serial No. 652,625

5 Claims. (Cl. 188—96)

This invention relates to improvements in dampers and more particularly relates to an improved form of linear damper for damping flutter of the adjustable air foil members of aircraft.

A principal object of the invention is to provide a novel and improved form of linear flutter damper, so arranged as to provide a substantially constant damping effect over a wide range of temperature variations.

A further object of the invention is to provide a simplified form of linear damper for damping the flutter of the adjustable air foil members of aircraft, providing a substantially balanced damping effect in each direction of movement of the piston of the damper.

A still further object of the invention is to provide an improved form of damper having a piston movable within a cylindrical damping chamber and a piston rod extensible from the damping chamber for connection with a stationary or movable part of an airplane, in which a damping orifice leads through the piston to afford communication from one side of the damping chamber to the other and in which a temperature compensating needle valve is adjustably mounted in the piston rod for cooperation with the damping orifice to provide a substantially constant damping effect over a wide range of temperature variations in accordance with the setting of the orifice control valve.

A still further object of the invention is to provide an improved form of balanced linear damper having an idle rod extending from the piston in an opposite direction from the piston rod and of the same cross-sectional area as the piston rod, together with guide means therefore vented to atmosphere.

Still another object of the invention is to provide an improved form of balanced linear damper in which a damping orifice leads through the piston of the damper and a temperature compensating valve has cooperation therewith to provide a substantially constant damping effect over a wide range of temperature changes and in which a damping fluid replenishing chamber has communication with the damping cylinder and enables the level of damping fluid in the replenishing chamber to be visually ascertained from the outside of the damper.

These and other objects of the invention will appear from time to time as the following specification proceeds and with reference to the accompanying drawing wherein:

The figure in the drawing is a longitudinal sectional view taken through a linear damper constructed in accordance with the invention.

In the embodiment of the invention illustrated in the drawing, reference character 10 designates generally a flutter damper constructed in accordance with my invention and capable of damping the tendency of the air foil assembly of an airplane to flutter.

The damper 10 comprises an elongated cylindrical housing 11 having an inner cylindrical wall 12 extending for the length of said housing and having a piston 13 movable therealong between an end closure plug 15, threaded within one end of said housing, and a chamber cap 16 forming an opposite wall of the damping chamber from the end closure 15, and separating the damping chamber from a replenishing chamber 17.

The chamber cap 16 has an enlarged diameter portion 19 abutting the wall 12 and engaging a shouldered portion 20 of said wall and forming a fixed abutment therefor. The chamber cap 16 also has a reduced diameter portion 21 extending along the replenishing chamber 17 for a portion of the length thereof and terminating into an end closure 23 closing an inner cylindrical wall 24 of said chamber cap. A locking pin 25 extending through the wall of the housing 11 and having engagement with the enlarged diameter portion 19 of the chamber cap 16, is provided to retain said chamber cap in position.

The chamber cap 16 besides defining an inner end wall of the damping chamber and separating the damping chamber from the fluid replenishing chamber 17, also forms a guide for an idle rod 26 extending from the piston 13 within said chamber cap. An O-ring 27 is provided to seal said chamber cap to said idle rod. A slot 29 extending along the cylindrical wall of the chamber cap is provided to vent the hollow interior portion of said chamber cap to atmosphere through a vent 30 to accommodate free movement of the idle rod 26 along the chamber cap 16.

A piston rod 31 extends from the opposite face of the piston 13 from the idle rod 26 through the end cap 15 for slidable movement along said end cap. The piston rod 31 is suitably sealed to said end cap by suitable sealing means such as an O-ring 32. The end cap 15 is shown as being threaded within the end of the housing 11 and as being sealed thereto as by an O-ring sealing means 33 and an annular seal 35 interposed between the head of said end cap and the end of the housing 11. A lock wire 36 is shown as being provided to lock the end cap 15 to the housing 11.

The piston rod 31 is shown as being drilled from the outer end thereof in axial alignment with the center thereof, to provide a relatively small diameter damping passageway 37 through the center of the piston 13 and having communication at its inner end with a cross-drilled passageway 39 extending across the idle rod 26. The passageway 37 also has communication at its end opposite the cross-drilled passageway 39 with a cross-drilled passageway 40 drilled through the piston rod 31. The passageways 37, 39 and 40 thus afford communication from one side of the piston 13 to the other and restrict the passage of damping fluid from one side of the piston to the other to provide a damping effect upon relative movement of the piston 13 with respect to the housing 11.

The passageway 37 has communication with an axially aligned passageway 41 in the piston rod 31, of a larger diameter than the passageway 37, and having a linearly expansible needle valve 43 mounted therein. The needle valve 43 is conical in form and extends within the passageway 37 to form with said passageway, an annular restricted damping orifice, restricting the flow of damping fluid from one side of the piston 13 to the other in accordance with the position of adjustment of said needle valve with respect to the passageway 37, and also expanding linearly to compensate for temperature changes and thereby provide a substantially constant damping effect over a wide range of variations in temperature.

The needle valve 43 is made from material having a higher rate of linear expansion than the rate of linear expansion of the piston rod 31 and may be made from a nylon thermoplastic material, or from any other suitable material having a higher rate of linear expansion than the rate of linear expansion of the piston rod 31.

As herein shown, the needle valve 43 has an enlarged diameter head 44, slotted at its outer end and threaded within an enlarged diameter threaded portion 45 of the piston rod 31. The needle valve 43 also has a reduced diameter stem 46, extending from said head and terminating into the conical end portion of the valve. An O-ring 49 recessed within the stem 46 and having engagement with the wall of the passageway 41 is provided to seal the stem 46 to said passageway.

A locking plug 50 threaded within the threaded portion of the piston rod 31 is provided to lock the needle valve 43 in a selected position of adjustment.

The threaded portion 45 of the piston rod 31 also affords a means for securing a connector 51 to said piston rod for connecting said piston rod to either a movable or stationary part of an aircraft. The connector 51 threaded within the threaded portion 45 in the piston rod 31 is shown as being locked in position as by a lock nut 53 threaded in said connector and abutting the outer end of the piston rod 31. The connector 51 may be of any well known form and is shown as being broken away for convenience in illustrating the damper. Spaced connecting ears 54, shown as being broken away, extend from the head end of the damper housing 11 for connection to either the stationary or movable part of an aircraft.

The opposite end of the housing 11 from the end cap 15 is shown as being closed by an end cap 55 threaded therein and sealed at the end of said housing as by an annular seal or gasket 56. A lock wire 57 is provided to lock said end cap in position. The end cap 55 is drilled therethrough in axial alignment with the center of the piston 13 and forms a slidable guide for a rod 59 extending outwardly from a replenishing piston 60.

The replenishing piston 60 has an annular groove 61 therein, carrying an O-ring seal 63 sealing said piston to the wall 12 of the housing 11. A compression spring 64 encircles the piston rod 59 and is seated at one end on the end cap 55, and at its opposite end on the piston 60, to bias the piston 60 in extended relation with respect to the replenishing chamber 17, and to feed hydraulic fluid through a passageway 65 and check valve chamber 66 formed in and extending along the enlarged diameter portion 19 of the cylinder cap 16 and affording a supply passageway from the replenishing chamber 17 to the damping chamber. A ball type check valve 67 in a check valve chamber 66 is provided to prevent the back flow of hydraulic fluid from the damping chamber to the replenishing chamber upon movement of the piston 13 toward the cylinder end cap 16.

The piston rod 59 is axially drilled throughout its length to accommodate hydraulic damping fluid to be introduced into the replenishing chamber 17 through a threaded inlet passageway 69 opening to the outer end of the piston rod 59. The threaded passageway 69 may afford a means for connecting a filling fitting (not shown) to said piston rod 59 when it is desired to fill the replenishing chamber 17 with damping fluid, and may have a plug (not shown) threaded therein, to close said passageway when the damper is in operation.

The inlet passageway 59 is in communication with a passageway 70 extending along a check valve seating member 71 mounted within an enlarged diameter chamber 73 extending along the piston and piston rod in axial alignment with the inlet or filling passageway 69. An O-ring seal 74 is provided to seal the check valve seating member 71 to the chamber 73.

The check valve seating member 71 has an annular seat 75 extending about the passageway 70 and forming a seat for a resilient check valve 76, shown as being in the form of a resilient disk, which may be made from an elastomer or like material which is unaffected by the action of the hydraulic damping fluid.

The check valve 76 is biased into engagement with the seat 75 as by a compression spring 77 extending along a stem 79 of a spider 80, and seated at one end on the check valve 76 and at its opposite end on said spider. The spring 77 biases the spider 80 into engagement with a spacer ring 81 abutting a resilient annular member 82, maintained in position within the chamber 73 as by a plug 83, threaded within the chamber 73 from the head end of the piston 60 and locked in position therein, as by an expansible locking plug 85, which may be made from nylon, or a like expansible material. The plug 83 is shown as having a passageway 86 extending axially therealong and affording communication to the replenishing chamber 17 from the inlet or filling passageway 69. The replenishing piston 60 thus affords a means for filling the replenishing chamber 17 and accommodates the filling of said replenishing chamber through the hollow interior of said replenishing piston, moving outwardly against the spring 64 as the damping chamber is filled with hydraulic fluid, the extent the piston rod 59 projects from the end cap 55, indicating the extent to which the replenishing chamber 17 is filled with hydraulic fluid.

It may be seen from the foregoing that a simple and improved flutter damper of the linear type has been provided in which the damping piston is hydraulically balanced by the idler rod guided and sealed to the chamber cap 16, and in which changes in temperature are compensated for by the temperature compensating needle valve 43, extending within and restricting the passageway 37, to form a restricted damping orifice adjustable to provide the required damping effort and varying with changes in temperature, to provide a substantially constant damping effect over a wide range of temperature variations.

It may further be seen that the damping fluid in the damper may be replenished through the replenishing piston 60, and that the level of damping fluid in the replenishing chamber is visually indicated in accordance with the extent the replenishing piston rod extends from the end of the damper housing.

While I have herein shown and described one form of which my invention may be embodied, it should be understood that various modifications and variations thereof may be effected without departing from the spirit and scope of the novel concepts thereof.

I claim as my invention:

1. In a linear damper, a housing having an inner wall defining a cylindrical damping chamber, a piston movable within said damping chamber having a passageway extending therealong and affording communication from one side of said piston to the other, a needle valve cooperating with said passageway in said piston to provide a restricted damping orifice, an end cap for said housing sealing one end of said damping chamber, a piston rod extending from one end of said piston through said end cap, an idle rod extending from the opposite end of said piston, a cylinder cap mounted within said housing and defining an opposite end of the damping chamber from said end cap, an idle rod extending from said piston within said cylinder cap and guided for slidable movement with respect thereto, means venting said cylinder cap to the atmosphere to accommodate free movement of said idle rod with respect thereto, a fluid replenishing chamber within said housing on the opposite side of said cylinder cap from said damping chamber, a replenishing passageway leading from said replenishing chamber through said cylinder cap to said damping chamber, a check valve preventing the backflow of fluid from said damping chamber to said replenishing chamber, a replenishing piston mounted in said replenishing chamber and biased toward said cylinder cap to exert a replenishing force to supply damping fluid to said damping chamber, said replenishing piston having a passageway extending therealong affording a means for filling said replenishing chamber and having a check valve means therein, retaining fluid to said replenishing chamber.

2. In a linear damper, a housing having an inner wall defining a cylindrical damping chamber, a piston movable within said damping chamber having a passageway extending therealong and affording communication from one side of said piston to the other, an end cap for said housing sealing one end of said damping chamber, a piston rod extending from one end of said piston through said end cap, an idle rod extending from the opposite end of said piston, a cylinder cap mounted within said housing and defining an opposite end of the damping chamber from said end cap, an idle rod extending from said piston within said cylinder cap and guided for slidable movement with respect thereto, means venting said cylinder cap to the atmosphere to accommodate free movement of said idle rod with respect thereto, a fluid replenishing chamber within said housing on the opposite side of said cylinder cap from said damping chamber, a replenishing passageway leading from said replenishing chamber through said cylinder cap to said damping chamber, a check valve preventing the backflow of fluid from said damping chamber to said replenishing chamber, a replenishing piston mounted in said replenishing chamber and biased toward said cylinder cap to exert a replenishing force to supply damping fluid to said damping chamber, said replenishing piston having a passageway extending therealong affording a means for filling said replenishing chamber and having a check valve means therein, retaining fluid to said replenishing chamber, a needle valve adjustably mounted in said piston rod and cooperating with said passageway to provide a restricted damping orifice, said needle valve being made from a nylon thermoplastic material having a greater rate of linear expansion than the rate of linear expansion of said piston rod, to provide a substantially constant damping effect over a wide range of temperature variations.

3. In a linear damper, a housing having an inner wall defining a cylindrical damping chamber, a piston movable within said damping chamber and having a passageway extending therethrough in axial alignment with the center of said damping chamber and affording fluid communication from one side of said piston to the other, a piston rod extending from one end of said piston to the outside of said housing, a needle valve adjustably mounted in said piston rod and cooperating with said passageway in said piston to provide a restricted damping orifice, an end cap for said housing having said piston rod slidably mounted therein and defining one end wall of said damping chamber, a cylinder cap mounted within said housing and forming an opposite end wall of said damping chamber, and having a generally cylindrical closed inner end portion, an idle rod extending from said piston within said cylinder cap and having substantially the same cross-sectional area as the cross-sectional area of said piston rod, and means venting said cylinder cap to the atmosphere to accommodate free movement of said idle rod with respect thereto, an end cap for the opposite end of said housing from said piston rod and spaced from said cylinder cap, a replenishing piston mounted in the space between said cylinder cap and last mentioned end cap and having a piston rod extending therefrom guided within said last mentioned end cap and extending outwardly therefrom, spring means biasing said replenishing piston toward said cylinder cap to provide pressure to replenish fluid in said damping chamber, a passageway and check valve affording communication to said damping chamber and preventing the backflow of fluid from said damping chamber to said replenishing piston, a passageway leading through said last mentioned piston rod and piston and affording a means for filling said housing with damping fluid, and check valve means within said passageway preventing the backflow of damping fluid out through said passageway, said replenishing piston rod extending outside of said last mentioned end cap and forming a means for visually indicating the quantity of damping fluid within said housing.

4. In a linear damper, a housing having an inner wall defining a cylindrical damping chamber, a piston movable within said damping chamber and having a passageway extending therethrough in axial alignment with the center of said damping chamber and affording fluid communication from one side of said piston to the other, a piston rod extending from one end of said piston to the outside of said housing, an end cap for said housing having said piston rod slidably mounted therein and defining one end wall of said damping chamber, a cylinder cap mounted within said housing and forming an opposite end wall of said damping chamber, and having a generally cylindrical closed inner end portion, an idle rod extending from said piston within said cylinder cap and having substantially the same cross-sectional area as the cross-sectional area of said piston rod, and means venting said cylinder cap to the atmosphere to accommodate free movement of said idle rod with respect thereto, an end cap for the opposite end of said housing from said piston rod and spaced from said cylinder cap, a replenishing piston mounted in the space between said cylinder cap and last mentioned end cap and having a piston rod extending therefrom guided within said last mentioned end cap and extending outwardly therefrom, spring means biasing said replenishing piston toward said cylinder cap to provide pressure to replenish fluid in said damping chamber, a passageway and check valve affording communication to said damping chamber and preventing the backflow of fluid from said damping chamber to said replenishing piston, a passageway leading through said piston rod and piston and affording a means for filling said housing with damping fluid, check valve means within said passageway preventing the backflow of damping fluid out through said passageway, said replenishing piston rod extending outside of said last mentioned end cap and forming a means for visually indicating the quantity of damping fluid within said housing, and a needle valve threaded within said piston rod for adjustable movement therealong and having a conical valve portion extending within said passageway and cooperating therewith to form a restricted damping orifice, said needle valve being made from a nylon thermoplastic material having a higher rate of linear coefficient of expansion than the rate of linear expansion of said piston rod, and providing a substantially constant damping effect over a wide range of variation in temperature.

5. In a linear damper, a housing having an inner wall defining a cylindrical damping chamber, a piston rectilinearly movable within said damping chamber and having a restricted passageway leading therethrough, a piston rod extending from said piston and guided for extensible movement from one end of said housing, a valve adjustably mounted in said piston rod and cooperating with the end of said passageway to form a restricted orifice, an idle rod extending from the opposite end of said piston from said piston rod, a cap member mounted within said damping chamber and forming an opposite end wall of said damping chamber from said piston rod and guiding said idle rod for reciprocable movement with respect to said damping chamber, means venting said cap member to the atmosphere to accommodate free movement of said idle rod therealong, a fluid replenishing chamber within said housing on the opposite side of said cap member from said replenishing chamber, and a replenishing piston in said replenishing chamber having a replenishing piston rod extending to the outside of said housing, said last mentioned piston rod being hollow to accommodate the filling of said replenishing chamber from the outside of said housing and visually indicating the quantity of damping fluid within said replenishing chamber.

References Cited in the file of this patent

UNITED STATES PATENTS

| | | |
|---|---|---|
| 1,914,677 | Shultz | June 30, 1933 |
| 2,334,115 | Meredith | Nov. 3, 1943 |
| 2,656,174 | Crookston | Oct. 30, 1953 |
| 2,716,470 | Focht | Aug. 30, 1955 |
| 2,758,679 | O'Connor et al. | Aug. 14, 1956 |
| 2,808,904 | O'Connor et al. | Oct. 8, 1957 |

FOREIGN PATENTS

| | | |
|---|---|---|
| 1,008,843 | France | Feb. 27, 1952 |